(12) United States Patent
Fonville et al.

(10) Patent No.: US 8,991,175 B2
(45) Date of Patent: Mar. 31, 2015

(54) CONTROL OF BALANCE DRIFT IN TURBOCHARGER ROTATING ASSEMBLY

(75) Inventors: Carl Eric Fonville, Ann Arbor, MI (US); Louis P. Begin, Rochester, MI (US)

(73) Assignee: GM Global Technology Operations LLC, Detroit, MI (US)

(*) Notice: Subject to any disclaimer, the term of this patent is extended or adjusted under 35 U.S.C. 154(b) by 428 days.

(21) Appl. No.: 13/432,489

(22) Filed: Mar. 28, 2012

(65) Prior Publication Data
US 2013/0255252 A1 Oct. 3, 2013

(51) Int. Cl.
| F02B 33/44 | (2006.01) |
| F04B 17/00 | (2006.01) |
| F04B 35/00 | (2006.01) |
| F01D 25/18 | (2006.01) |
| F16C 19/00 | (2006.01) |
| F02B 39/14 | (2006.01) |

(Continued)

(52) U.S. Cl.
CPC .............. *F02B 39/14* (2013.01); *F02B 39/005* (2013.01); *F01D 25/16* (2013.01); *F01D 25/18* (2013.01); *F01D 25/20* (2013.01); *F01D 25/125* (2013.01); *F01M 1/02* (2013.01); *F02C 6/12* (2013.01); *F02C 7/06* (2013.01); *F01M 2011/021* (2013.01); *F05B 2220/40* (2013.01); *Y02T 10/144* (2013.01)
USPC ........ 60/605.3; 60/605.1; 417/407; 184/6.11; 384/464

(58) Field of Classification Search
CPC ........ F02B 39/14; F02B 39/005; F01D 25/16; F01D 25/18; F01D 25/20; F01D 25/125; F01M 1/02; F01M 2011/021; F02C 6/12; F02C 7/06; F05B 2220/40; Y02T 10/144
USPC .................... 60/605.3, 605.1; 417/406–407; 415/110, 206, 122.1, 200, 160, 175; 184/6.11; 428/34.4; 384/464; 277/306
See application file for complete search history.

(56) References Cited

U.S. PATENT DOCUMENTS

| 2,556,020 | A | * | 6/1951 | Williams | ....................... 416/171 |
| 2,799,227 | A | * | 7/1957 | Allen | ........................... 417/357 |

(Continued)

FOREIGN PATENT DOCUMENTS

| DE | 4413101 A1 | 10/1995 |
| DE | 102009058068 A1 | 6/2011 |

(Continued)

*Primary Examiner* — Thai Ba Trieu
(74) *Attorney, Agent, or Firm* — Quinn Law Group, PLLC

(57) ABSTRACT

A turbocharger for an internal combustion engine includes a bearing housing with a bearing bore and a thrust wall. The bearing housing includes a journal bearing disposed within the bore. The turbocharger also includes a shaft supported by the journal bearing for rotation about an axis within the bore. The turbocharger also includes a turbine wheel fixed to the shaft and configured to be rotated about the axis by the engine's post-combustion gasses. The turbocharger additionally includes a compressor wheel fixed to the shaft and configured to pressurize an ambient airflow. Furthermore, the turbocharger includes a thrust bearing assembly pressed onto the shaft and configured to transmit thrust forces developed by the turbine wheel to the thrust wall. Pressing the thrust bearing assembly onto the shaft minimizes radial motion between the thrust bearing assembly and the shaft. An internal combustion engine employing such a turbocharger is also disclosed.

19 Claims, 3 Drawing Sheets

(51) Int. Cl.
*F02B 39/00* (2006.01)
*F01D 25/16* (2006.01)
*F01D 25/20* (2006.01)
*F01D 25/12* (2006.01)
*F01M 1/02* (2006.01)
*F02C 6/12* (2006.01)
*F02C 7/06* (2006.01)
*F01M 11/02* (2006.01)

(56) References Cited

U.S. PATENT DOCUMENTS

| | | | | |
|---|---|---|---|---|
| 3,969,804 | A * | 7/1976 | MacInnes et al. | 417/407 |
| 4,364,717 | A * | 12/1982 | Schippers et al. | 417/407 |
| 4,376,617 | A * | 3/1983 | Okano et al. | 417/407 |
| 4,420,160 | A * | 12/1983 | Laham | 277/306 |
| 4,427,309 | A * | 1/1984 | Blake | 384/286 |
| 4,523,763 | A * | 6/1985 | Asano et al. | 277/419 |
| 4,613,288 | A * | 9/1986 | McInerney | 417/407 |
| 5,967,762 | A * | 10/1999 | Keller et al. | 417/407 |
| 6,499,884 | B1 * | 12/2002 | Svihla et al. | 384/138 |
| 7,025,579 | B2 * | 4/2006 | Woollenweber et al. | 417/407 |
| 7,677,041 | B2 * | 3/2010 | Woollenweber | 60/608 |
| 7,946,118 | B2 * | 5/2011 | Hippen et al. | 60/605.3 |
| 2002/0155009 | A1 | 10/2002 | Panos et al. | |
| 2004/0200215 | A1 | 10/2004 | Woollenweber et al. | |
| 2010/0129212 | A1 | 5/2010 | Berger et al. | |
| 2010/0284824 | A1 * | 11/2010 | Hippen et al. | 415/110 |
| 2012/0288367 | A1 | 11/2012 | Boening et al. | |
| 2013/0202432 | A1 * | 8/2013 | House et al. | 415/229 |
| 2013/0205775 | A1 * | 8/2013 | Begin et al. | 60/605.3 |

FOREIGN PATENT DOCUMENTS

| | | | |
|---|---|---|---|
| DE | 102010034766 A1 | 2/2012 | |
| JP | 2013002466 A * | 1/2013 | |
| WO | WO 2012058111 A2 * | 5/2012 | F02B 39/00 |

* cited by examiner

US 8,991,175 B2

CONTROL OF BALANCE DRIFT IN TURBOCHARGER ROTATING ASSEMBLY

TECHNICAL FIELD

The present disclosure relates to controlling balance drift in a rotating assembly of a turbocharger.

BACKGROUND

Internal combustion engines (ICE) are often called upon to generate considerable levels of power for prolonged periods of time on a dependable basis. Many such ICE assemblies employ a supercharging device, such as an exhaust gas turbine driven turbocharger, to compress the airflow before it enters the intake manifold of the engine in order to increase power and efficiency.

Specifically, a turbocharger is a centrifugal gas compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power.

A typical turbocharger employs a central shaft that is supported by one or more bearings and transmits rotational motion between an exhaust-driven turbine wheel and an air compressor wheel. Both the turbine and compressor wheels are fixed to the shaft, which in combination with various bearing components constitute the turbocharger's rotating assembly. Because the rotating assembly frequently operates at speeds over 100,000 revolutions per minute (RPM), the balance of such an assembly is essential for long term durability of the turbocharger.

SUMMARY

One embodiment of the disclosure is directed to a turbocharger for an internal combustion engine that includes a bearing housing with a bearing bore and a thrust wall. The bearing housing includes a journal bearing disposed within the bore. The turbocharger also includes a shaft having a first end and a second end, the shaft being supported by the journal bearing for rotation about an axis within the bore. The turbocharger also includes a turbine wheel fixed to the shaft proximate to the first end and configured to be rotated about the axis by post-combustion gasses emitted by the engine. The turbocharger additionally includes a compressor wheel fixed to the shaft proximate to the second end and configured to pressurize an airflow being received from the ambient for delivery to the engine. Furthermore, the turbocharger includes a thrust bearing assembly pressed onto the shaft and configured to transmit thrust forces developed by the turbine wheel to the thrust wall. Pressing the thrust bearing assembly onto the shaft minimizes radial motion between the thrust bearing assembly and the shaft.

The shaft may include a shoulder. In such a case, the compressor wheel may be retained on the shaft via a fastener, such as a jam nut, and the compressor wheel may be urged against the thrust bearing assembly and the thrust bearing assembly urged against the shoulder as the fastener is tightened.

The thrust bearing assembly may include a thrust collar and a thrust washer. The thrust collar may be configured to urge the thrust washer against the shoulder as the fastener is tightened.

Engine oil may be directed to lubricate the thrust bearing assembly and generate an oil film between the thrust washer and the thrust wall.

The pressing of the thrust bearing assembly onto the shaft may generate an interference fit in the range of about 5-15 μm between the thrust bearing assembly and the shaft.

The compressor wheel may be pressed onto the shaft. The pressing of the compressor wheel onto the shaft may generate an interference fit in the range of about 25-30 μm between the compressor wheel and the shaft.

The thrust bearing assembly may be positioned on the shaft along the axis between the journal bearing and the compressor wheel.

Another embodiment of the present disclosure is directed to an internal combustion engine having the turbocharger described above.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
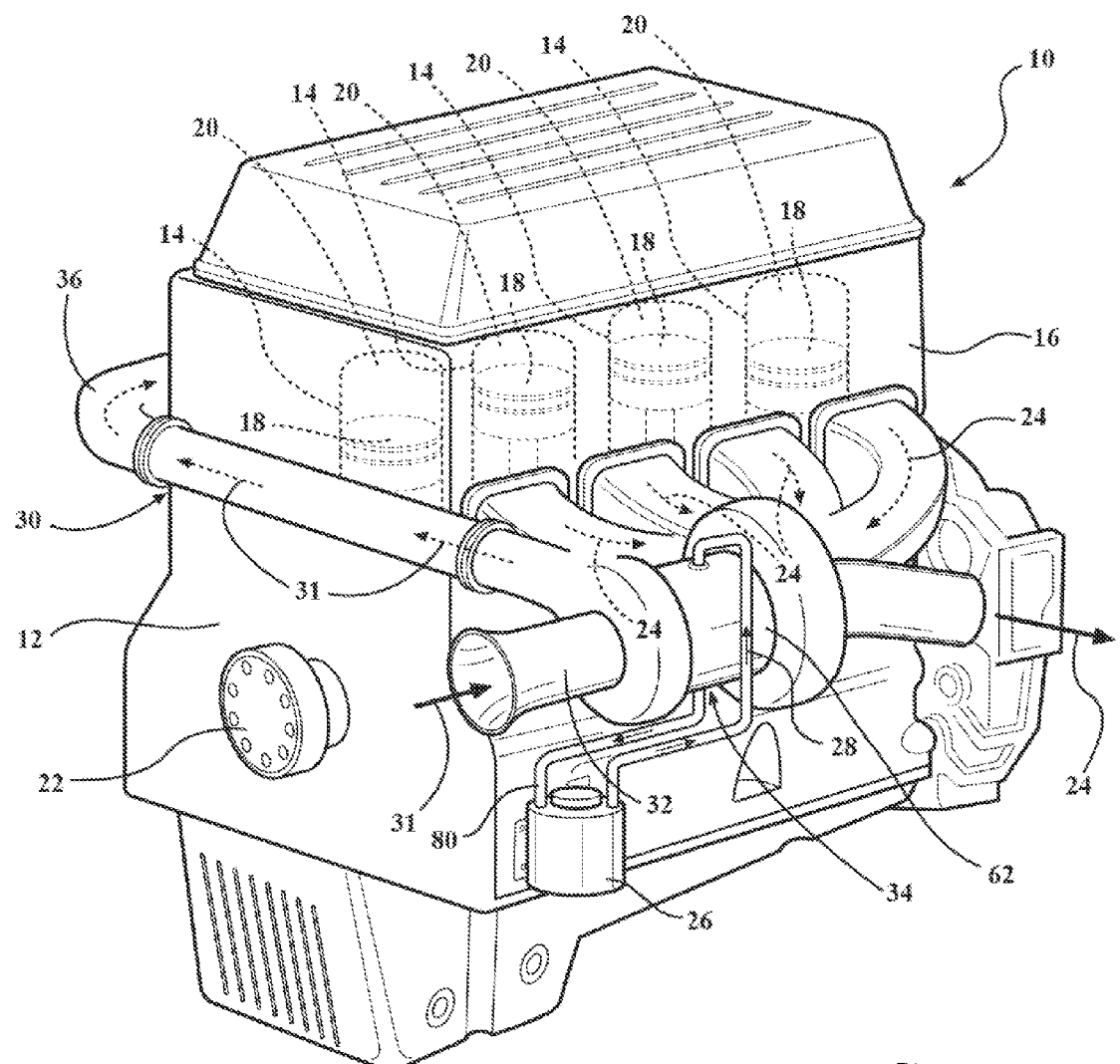
FIG. 1 is a schematic perspective view of an engine with a turbocharger according to the disclosure.

Referring to the drawings wherein like reference numbers correspond to like or similar components throughout the several figures, FIG. 1 illustrates an internal combustion engine 10. The engine 10 also includes a cylinder block 12 with a plurality of cylinders 14 arranged therein. As shown, the engine 10 also includes a cylinder head 16. Each cylinder 14 includes a piston 18 configured to reciprocate therein. Combustion chambers 20 are formed within the cylinders 14 between the bottom surface of the cylinder head 16 and the tops of the pistons 18. As known by those skilled in the art, combustion chambers 20 are configured to receive a fuel-air mixture for subsequent combustion therein.

The engine 10 also includes a crankshaft 22 configured to rotate within the cylinder block 12. The crankshaft 22 is rotated by the pistons 18 as a result of an appropriately proportioned fuel-air mixture being burned in the combustion chambers 20. After the air-fuel mixture is burned inside a specific combustion chamber 20, the reciprocating motion of a particular piston 18 serves to exhaust post-combustion gases 24 from the respective cylinder 14. The engine 10 also includes an oil pump 26. The oil pump 26 is configured to supply pressurized engine oil 28 to various bearings, such as that of the crankshaft 22. The oil pump 26 may be driven directly by the engine 10, or by an electric motor (not shown).

The engine 10 additionally includes an induction system 30 configured to channel airflow 31 from the ambient to the cylinders 14. The induction system 30 includes an intake air duct 32, a turbocharger 34, and an intake manifold 36. Although not shown, the induction system 30 may additionally include an air filter upstream of the turbocharger 34 for removing foreign particles and other airborne debris from the airflow 31. The intake air duct 32 is configured to channel the airflow 31 from the ambient to the turbocharger 34, while the turbocharger is configured to pressurize the received airflow, and discharge the pressurized airflow to the intake manifold 36. The intake manifold 36 in turn distributes the previously pressurized airflow 31 to the cylinders 14 for mixing with an appropriate amount of fuel and subsequent combustion of the resultant fuel-air mixture.

Figure 2:
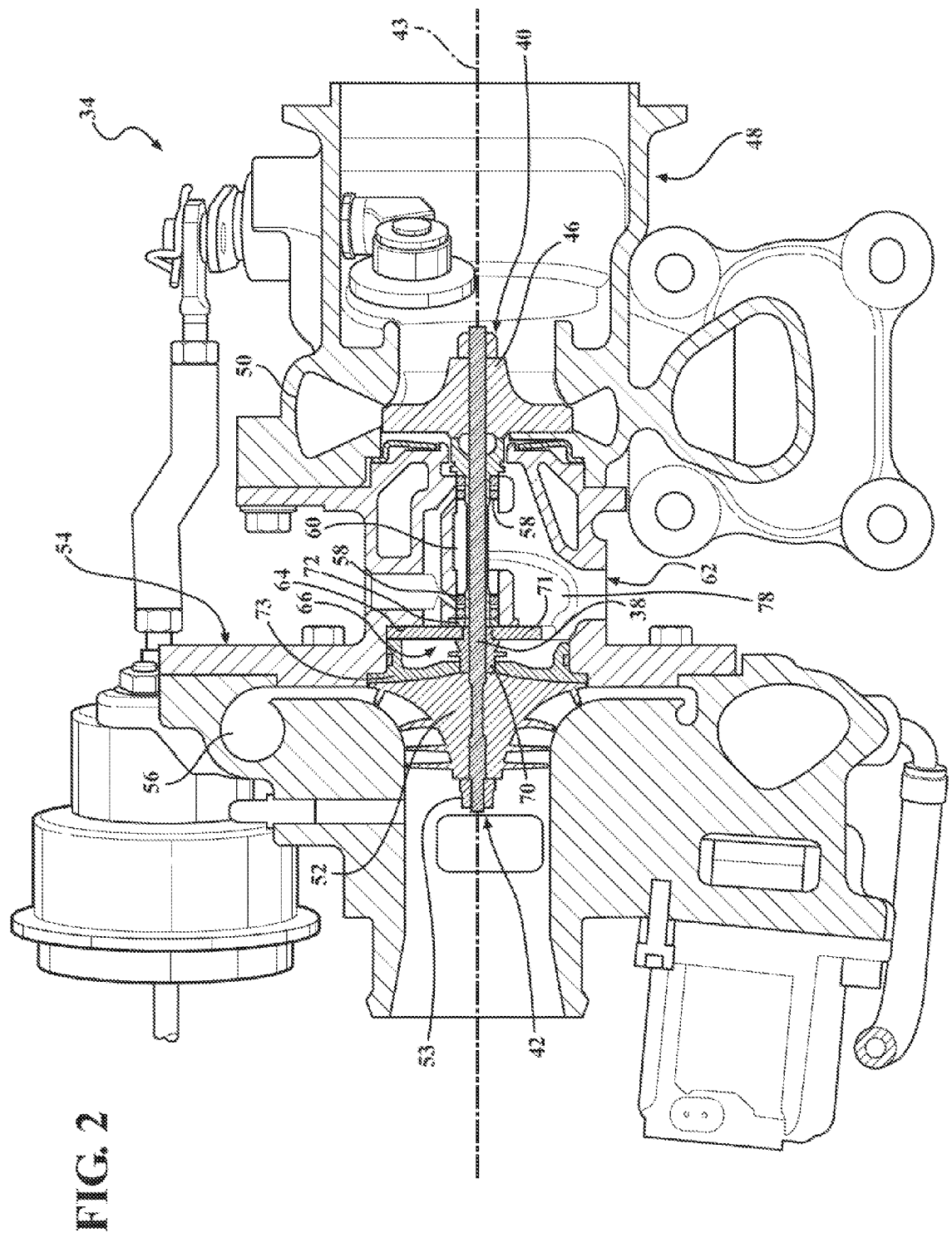
FIG. 2 is a schematic cross-sectional view of the turbocharger shown in FIG. 1, wherein the turbocharger includes a bearing housing supporting the turbocharger's rotating shaft.

As shown in FIG. 2, the turbocharger 34 includes a steel shaft 38 having a first end 40 and a second end 42. A turbine wheel 46 is mounted on the shaft 38 proximate to the first end 40 and configured to be rotated along with the shaft 38 about an axis 43 by post-combustion gasses 24 emitted from the cylinders 14. The turbine wheel 46 is typically formed from a temperature and oxidation resistant material, such as a nickel-chromium-based "inconel" super-alloy to reliably withstand temperatures of the post-combustion gasses 24 which in some engines may approach 2,000 degrees Fahrenheit. The turbine wheel 46 is disposed inside a turbine housing 48 that includes a volute or scroll 50. The scroll 50 receives the post-combustion exhaust gases 24 and directs the exhaust gases to the turbine wheel 46. The scroll 50 is configured to achieve specific performance characteristics, such as efficiency and response, of the turbocharger 34.

As further shown in FIG. 2, the turbocharger 34 also includes a compressor wheel 52 mounted on the shaft 38 between the first and second ends 40, 42. The compressor wheel 52 is retained on the shaft 38 via a specially configured fastener, such as a jam nut 53. As understood by those skilled in the art, a jam nut 53 is a type of a fastener that includes pinched or unequal thread pitch internal threads to engage external threads of a mating component, for example the shaft 38. Such a thread configuration of the jam nut 53 serves to minimize the likelihood of the jam nut coming loose from the shaft 38 during operation of the turbocharger 34. Additionally, the direction of the thread on the jam nut 53 may be selected such that the jam nut will have a tendency to tighten rather than loosen as the shaft 38 is spun up by the post-combustion gasses 24.

The compressor wheel 52 is configured to pressurize the airflow 31 being received from the ambient for eventual delivery to the cylinders 14. The compressor wheel 52 is disposed inside a compressor cover 54 that includes a volute or scroll 56. The scroll 56 receives the airflow 31 and directs the airflow to the compressor wheel 52. The scroll 56 is configured to achieve specific performance characteristics, such as peak airflow and efficiency of the turbocharger 34. Accordingly, rotation is imparted to the shaft 38 by the post-combustion exhaust gases 24 energizing the turbine wheel 46, and is in turn communicated to the compressor wheel 52 owing to the compressor wheel being fixed on the shaft. As understood by those skilled in the art, the variable flow and force of the post-combustion exhaust gases 24 influences the amount of boost pressure that may be generated by the compressor wheel 52 throughout the operating range of the engine 10. The compressor wheel 52 is typically formed from a high-strength aluminum alloy that provides the compressor wheel with reduced rotating inertia and quicker spin-up response.

With continued reference to FIG. 2, the shaft 38 is supported for rotation about the axis 43 via a journal bearing 58. The journal bearing 58 is mounted in a bore 60 of a bearing housing 62 and is lubricated and cooled by the supply of pressurized engine oil 28 supplied via the pump 26. The bearing housing 62 includes a thrust wall 64. The bearing housing 62 may be cast from a robust material such as iron in order to provide dimensional stability to the bore 60 under elevated temperatures and loads during operation of the turbocharger 34. The journal bearing 58 is configured to control radial motion and vibrations of the shaft 38. As shown, the journal bearing 58 may be a fully-floating or a semi-floating type that is formed from a relatively soft metal, for example brass or bronze, such that any debris that passes through the bearing system would become embedded in the soft bearing material and not damage the shaft 38 or the bore 60. The journal bearing 58 may also be configured as a roller or ball bearing to further reduce turbocharger frictional losses during rotation of the shaft 38.

As shown in FIG. 2, the turbocharger 34 also includes a thrust bearing assembly 66. The thrust bearing assembly 66 includes a thrust collar 70 and a thrust washer 72. The turbocharger 34 also includes a thrust plate 71 that is held in place by a thrust retainer 73 against the bearing wall 64. The bearing surface of the thrust plate 71 is typically formed from a relatively soft metal, for example brass or bronze, such that any debris that passes through the bearing system would become embedded in the soft bearing material and not damage the thrust collar 70 or the thrust washer 72. The thrust retainer 73 may be held in place by a clip, one or more bolts, or otherwise attached to the housing 62 in order to hold the thrust bearing assembly 66 securely against the bearing wall 64.

The thrust bearing assembly 66 counteracts the net thrust force developed within the turbocharger 34, when such a force is acting towards the compressor wheel 52. Although not shown, the thrust bearing assembly 66 may additionally include an additional thrust washer positioned on the side of the compressor wheel 52, as well as other configurations, as known by those skilled in the art. As shown, the thrust bearing assembly 66 is positioned on the shaft 38 along the axis 43, between the journal bearing 58 and the compressor wheel 52 and are pressed onto the shaft. The bearing assembly 66 is lubricated and cooled by the supply of pressurized engine oil 28 supplied via the pump 26. During operation of the turbocharger 34, i.e., when the turbine wheel 46 is energized by the post-combustion gases 24, the thrust washer 72 transmits thrust forces developed by the turbine wheel to the thrust plate 71. The bearing assembly 66 being pressed onto the shaft 38 serves to minimize radial motion between the thrust bearing assembly and the shaft.

Figure 3:
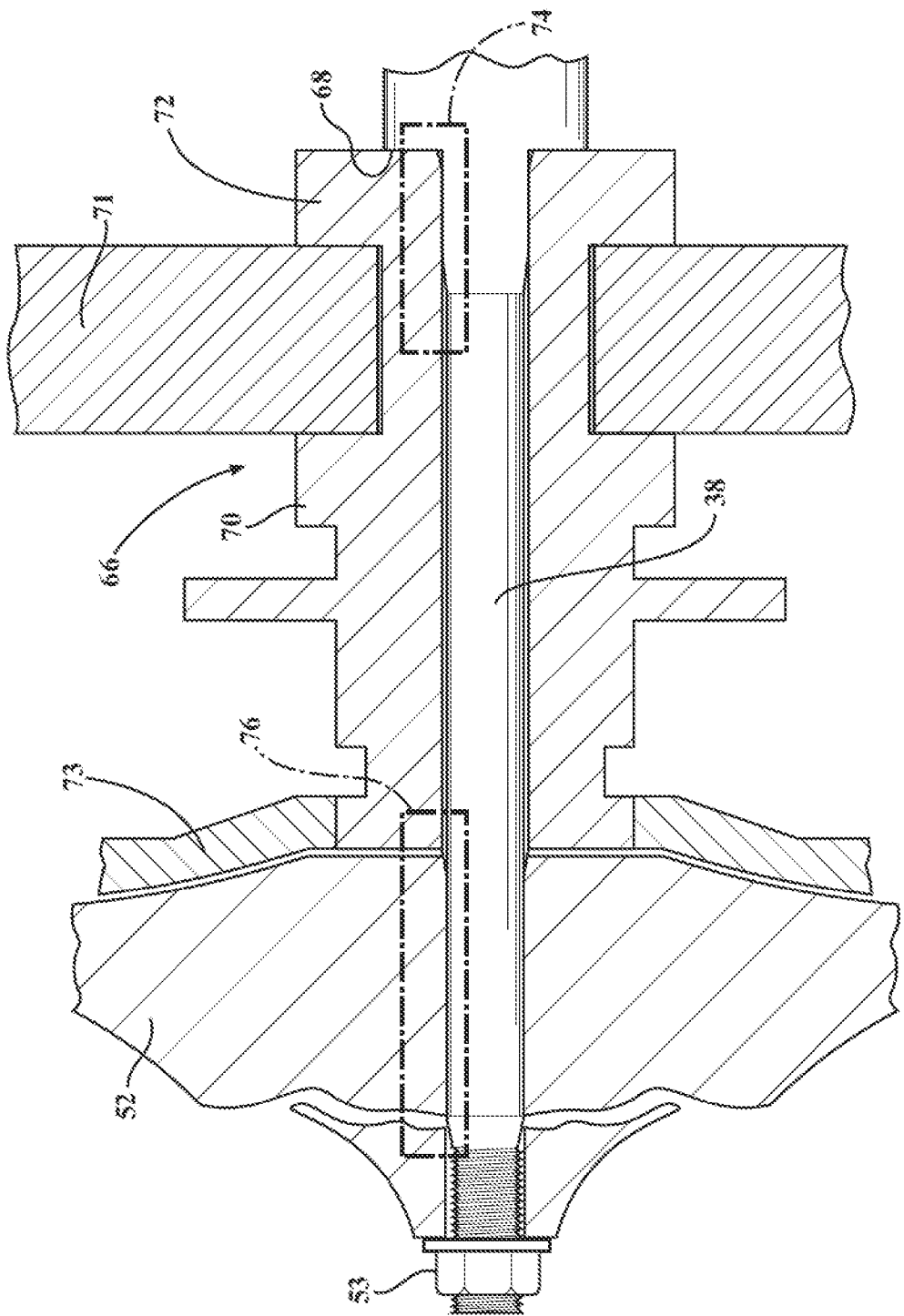
FIG. 3 is a schematic close-up partial cross-sectional view of the bearing housing shown in FIG. 2, specifically showing a thrust bearing assembly and a compressor wheel that are pressed onto the shaft.

As shown in FIG. 3, the shaft 38 includes a shoulder 68. During assembly of the turbocharger 34, as the jam nut 53 is tightened onto the shaft 38, the compressor wheel 52 is urged against the thrust bearing assembly 66 and the thrust bearing assembly is urged against the shoulder 68. Accordingly, the tightening of the jam nut 53 squeezes the thrust bearing assembly 66 between the compressor wheel 52 and the shoulder 68.

During assembly of the thrust bearing assembly 66 onto the shaft 38, the thrust collar 70 is configured to urge the thrust washer 72 against the shoulder 68 as the jam nut 53 is tightened. During operation of the turbocharger 34, the pressurized engine oil 28 from the pump 26 is delivered to the bearing housing 62 and directed to lubricate the thrust bearing assembly 66 and generate an oil film between the thrust washer 72 and the thrust plate 71. Such an oil film serves to reduce the likelihood of direct physical contact between the thrust washer 72 and the thrust plate 71. In turn, such reduction of direct contact between the thrust washer 72 and the thrust plate 71 serves to extend useful life of the thrust bearing assembly 66 and durability of the turbocharger 34.

As shown in FIG. 3, in order to affect continuous firm or tight contact at the interface between the thrust bearing assembly 66 and the shaft 38, the internal diameters of the thrust collar 70 and the thrust washer 72 and the external diameter of the shaft 38 may be sized to generate an interference fit between the mating components indicated generally in phantom by area 74. The interference fit 74 between the thrust collar 70 and the shaft 38, and between the thrust washer 72 and the shaft 38 may for example be in the approximate range of 5-15 μm. Such an interference fit range is likely to be sufficient to maintain the desired firm contact when the thrust collar 70, the thrust washer 72, and the shaft 38 expand and contract during operation of the turbocharger 34, such as between the temperature extremes likely to be encountered within the bearing housing 62.

As additionally shown in FIG. 3, the compressor wheel 52 may also be pressed onto the shaft 38. The internal diameter of the compressor wheel 52 may be selected such that an interference fit indicated generally in phantom by area 76 is generated between the compressor wheel and the external diameter of the shaft 38. The interference fit 76 between the compressor wheel 52 and the shaft 38 may for example be in the approximate range of 25-30 μm. Such an interference fit between the compressor wheel 52 and the shaft 38 is typically greater than that of the thrust bearing assembly 66 and the shaft because aluminum alloys possess greater coefficients of thermal expansion than steel, which is typically used for the thrust collar 70 and the thrust washer 72. Additionally, the compressor wheel 52 has a greater external diameter than does the thrust bearing assembly 66, and, as a result, the external diameter of the compressor wheel typically experiences greater expansion due to the centrifugal forces encountered during operation of the turbocharger 30.

The above-described interference fit 76 between the thrust bearing assembly 66 and the shaft 38, as well as between the compressor wheel 52 and the shaft, is desirable in order to limit radial motion of the bearing assembly and the compressor wheel relative to the shaft. Such radial motion is generally undesirable because it may lead to balance drift, dynamic instability, rotor vibration, noise, and possible overload of the journal bearing 58.

With resumed reference to FIG. 2, the bearing housing 62 includes a drain volume 78 for the engine oil that is supplied to the bearing housing from the pump 26. The drain volume 78 is an inner reservoir incorporated into the bearing housing 62 that receives the oil after the oil had passed through the journal bearing 58 and the thrust bearing assembly 66. As shown in FIG. 1, a discharge passage 80 removes oil from the bearing housing 62 following the lubrication of the thrust bearing assembly 66 and the oil's collection within the drain volume 78. As additionally shown in FIG. 1, the discharge passage 80 is in fluid communication with the pump 26 in order to return to the pump the oil from the drain volume 78.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An internal combustion engine comprising:
   a cylinder configured to receive an air-fuel mixture for combustion therein;
   a reciprocating piston disposed inside the cylinder and configured to exhaust post-combustion gasses from the cylinder; and
   a turbocharger including:
      a bearing housing having a bearing bore and a thrust wall;
      a journal bearing disposed within the bore;
      a shaft having a first end and a second end, the shaft being supported by the journal bearing for rotation about an axis within the bore;
      a turbine wheel fixed to the shaft proximate to the first end and configured to be rotated about the axis by the post-combustion gasses;
      a compressor wheel fixed to the shaft proximate to the second end and configured to pressurize an airflow being received from the ambient for delivery to the cylinder; and
      a thrust bearing assembly pressed onto the shaft and configured to transmit thrust forces developed by the turbine wheel to the thrust wall;
      wherein pressing the thrust bearing assembly onto the shaft minimizes radial motion between the thrust bearing assembly and the shaft during operation of the turbocharger.

2. The engine of claim 1, wherein the shaft includes a shoulder, the compressor wheel is retained on the shaft via a fastener, and wherein the compressor wheel is urged against the thrust bearing assembly and the thrust bearing assembly is urged against the shoulder as the fastener is tightened.

3. The engine of claim 2, wherein the thrust bearing assembly includes a thrust collar and a thrust washer, and wherein the thrust collar is configured to urge the thrust washer against the shoulder as the fastener is tightened.

4. The engine of claim 3, further comprising an oil pump configured to pressurize engine oil, wherein the pressurized engine oil is directed to lubricate the thrust bearing assembly and generate an oil film between the thrust washer and the thrust wall.

5. The engine of claim 1, wherein the pressing of the thrust bearing assembly onto the shaft generates an interference fit in a range of approximately 5-15 μm between the thrust bearing assembly and the shaft.

6. The engine of claim 1, wherein the compressor wheel is pressed onto the shaft.

7. The engine of claim 6, wherein the pressing of the compressor wheel onto the shaft generates an interference fit in a range of approximately 25-30 μm between the compressor wheel and the shaft.

8. The engine of claim 1, wherein the thrust bearing assembly is positioned on the shaft along the axis between the journal bearing and the compressor wheel.

9. A turbocharger for an internal combustion engine, the turbocharger comprising:
   a bearing housing having a bearing bore and a thrust wall;
   a journal bearing disposed within the bore;
   a shaft having a first end and a second end, the shaft being supported by the journal bearing for rotation about an axis within the bore;
   a turbine wheel fixed to the shaft proximate to the first end and configured to be rotated about the axis by post-combustion gasses emitted by the engine;
   a compressor wheel fixed to the shaft proximate to the second end and configured to pressurize an airflow being received from the ambient for delivery to the engine; and
   a thrust bearing assembly pressed onto the shaft and configured to transmit thrust forces developed by the turbine wheel to the thrust wall;
   wherein pressing the thrust bearing assembly onto the shaft minimizes radial motion between the thrust bearing assembly and the shaft during operation of the turbocharger.

10. The turbocharger of claim 9, wherein the shaft includes a shoulder, the compressor wheel is retained on the shaft via a fastener, and wherein the compressor wheel is urged against the thrust bearing assembly and the thrust bearing assembly is urged against the shoulder as the fastener is tightened.

11. The turbocharger of claim 10, wherein the thrust bearing assembly includes a thrust collar and a thrust washer, and wherein the thrust collar is configured to urge the thrust washer against the shoulder as the fastener is tightened.

12. The turbocharger of claim 11, wherein engine oil is directed to lubricate the thrust bearing assembly and generate an oil film between the thrust washer and the thrust wall.

13. The turbocharger of claim 9, wherein the pressing of the thrust bearing assembly onto the shaft generates an interference fit in a range of approximately 5-15 µm between the thrust bearing assembly and the shaft.

14. The turbocharger of claim 9, wherein the compressor wheel is pressed onto the shaft.

15. The turbocharger of claim 14, wherein the pressing of the compressor wheel onto the shaft generates an interference fit in a range of approximately 25-30 µm between the compressor wheel and the shaft.

16. The turbocharger of claim 9, wherein the thrust bearing assembly is positioned on the shaft along the axis between the journal bearing and the compressor wheel.

17. A turbocharger for an internal combustion engine, the turbocharger comprising:
   a bearing housing having a bearing bore and a thrust wall;
   a journal bearing disposed within the bore;
   a shaft having a first end and a second end, the shaft being supported by the journal bearing for rotation about an axis within the bore;
   a turbine wheel fixed to the shaft proximate to the first end and configured to be rotated about the axis by post-combustion gasses emitted by the engine;
   a compressor wheel pressed onto the shaft proximate to the second end and configured to pressurize an airflow being received from the ambient for delivery to the engine; and
   a thrust collar and a thrust washer each pressed onto the shaft and together configured to transmit thrust forces developed by the turbine wheel to the thrust wall;
   wherein:
      the thrust collar is configured to urge the thrust washer against the shoulder as the fastener is tightened; and
      the compressor wheel, the thrust collar, and the thrust washer collectively pressed onto the shaft minimizes radial motion between the thrust collar, the thrust washer, and the shaft.

18. The turbocharger of claim 17, wherein the shaft includes a shoulder, the compressor wheel is retained on the shaft via a fastener, and wherein the compressor wheel is urged against the thrust bearing assembly and the thrust bearing assembly is urged against the shoulder as the fastener is tightened.

19. The turbocharger of claim 18, wherein:
   the pressing of the thrust collar and a thrust washer onto the shaft generates an interference fit in a range of approximately 5-15 µm between the thrust collar, the thrust washer, and the shaft; and
   the pressing of the compressor wheel onto the shaft generates an interference fit in a range of approximately 25-30 µm between the compressor wheel and the shaft.

* * * * *